(12) United States Patent
Hsu et al.

(10) Patent No.: US 8,866,035 B2
(45) Date of Patent: Oct. 21, 2014

(54) TRIAXIAL DRIVING DEVICE FOR AN ELECTRODISCHARGE MACHINE TOOL

(75) Inventors: Shih-Lung Hsu, Tainan (TW);
Chin-Juei Tung, Tainan (TW);
Hsiung-Sheng Hsu, Tainan (TW);
Cheng-Chang Wu, Tainan (TW)

(73) Assignee: Yihawjet Enterprises Co., Ltd., Tainan (TW)

( * ) Notice: Subject to any disclaimer, the term of this patent is extended or adjusted under 35 U.S.C. 154(b) by 502 days.

(21) Appl. No.: 13/337,510

(22) Filed: Dec. 27, 2011

(65) Prior Publication Data

US 2013/0161294 A1 Jun. 27, 2013

(51) Int. Cl.
*B23H 1/04* (2006.01)

(52) U.S. Cl.
USPC ................................. 219/69.15; 219/69.11

(58) Field of Classification Search
USPC ........................................ 219/69.15, 69.11
See application file for complete search history.

(56) References Cited

U.S. PATENT DOCUMENTS

| | | | |
|---|---|---|---|
| 3,440,933 A | | 4/1969 | Sutton |
| 4,764,653 A | * | 8/1988 | Buhler ...................... 219/69.15 |
| 5,293,022 A | * | 3/1994 | Onandia-Alberdi ....... 219/69.11 |

FOREIGN PATENT DOCUMENTS

| | | |
|---|---|---|
| CN | 1109809 A | 10/1995 |
| CN | 1454746 A | 11/2003 |
| CN | 202224783 U | 5/2012 |
| EP | 0504691 A2 | 9/1992 |
| FR | 2791588 A1 | 10/2000 |
| JP | 56003141 A | 1/1981 |
| JP | 2002036032 A | 2/2002 |
| TW | I310712 B | 6/2009 |
| TW | M363374 U | 8/2009 |

OTHER PUBLICATIONS

Chinese Patent Office, Office Action, date(Apr. 23, 2014) should be included.

* cited by examiner

*Primary Examiner* — Jianying Atkisson
(74) *Attorney, Agent, or Firm* — Rabin & Berdo, P.C.

(57) ABSTRACT

A triaxial driving device for electrodischarge machine tools having a three-liners-axes mechanism and an electrode tool and has a connecting mount, a first axial rotator, a base, a supporting arm, a second axial rotator, a third axial rotator and an electrode holder. The connecting mount is connected securely to the three-liners-axes mechanism. The first axial rotator is mounted in the connecting mount and has a rotating head. The base is connected securely to the rotating head of the first axial rotator and has a space. The supporting arm is rotatably mounted in the space of the base and has a connecting frame. The second axial rotator is securely connected to the base and the supporting arm and has a rotating head. The third axial rotator is connected to the supporting arm and has a rotating head. The electrode holder is connected to the third axial rotator and the electrode tool.

6 Claims, 7 Drawing Sheets

TRIAXIAL DRIVING DEVICE FOR AN ELECTRODISCHARGE MACHINE TOOL

BACKGROUND OF THE INVENTION

1. Field of the Invention

The present invention relates to a triaxial driving device for an electrodischarge machine tool, and more particularly to a triaxial driving device that can be mounted between a three-linear-axes drive mechanism and an electrode tool of the electrodischarge machine tool to provide further triaxial movement to the electrode tool and can provide six-axial motion to the electrodischarge machine tool.

2. Description of the Prior Arts

Conventional electrodischarge machine tools have been extensive used in mold manufacture and machine work. The conventional electrodischarge machine tool has a three-liners-axes mechanism and an electrode tool. The three-liners-axes mechanism can provide three-linear movement (X-, Y- and Z-axis directions). The electrode tool is attached securely to one of the linear axes of the three-liners-axes mechanism to form an electrodischarge machining (E.D.M) process on a work-piece.

Although the conventional electrodischarge machine tool can be used to process the work-piece, the conventional electrodischarge machine tool cannot process a work-piece with complicated structures. Then, a dividing-plate driving device is mounted on one of the linear axes of the three-liners-axes mechanism and is connected to the electrode tool to provide further triaxial movement to the electrode tool. However, the precision of the dividing-plate driving device is not sufficient, and the control conducting wires of the dividing-plate driving device are exposed out of the dividing-plate driving device and may be entangled with the external devices of the conventional electrodischarge machine tool.

To overcome the shortcomings, the present invention provides a triaxial driving device for an electrodischarge machine tool to mitigate or obviate the aforementioned problems.

SUMMARY OF THE INVENTION

The main objective of the present invention is to provide a triaxial driving device for an electrodischarge machine tool, and more particularly to a triaxial driving device that can be mounted between a three-linear-axes drive mechanism and an electrode tool of the electrodischarge machine tool to provide further triaxial movement to the electrode tool and can provide six-axial motion to the electrodischarge machine tool.

The triaxial driving device for an electrodischarge machine tool having a three-liners-axes mechanism and an electrode tool in accordance with the present invention has a connecting mount, a first axial rotator, a base, a supporting arm, a second axial rotator, a third axial rotator and an electrode holder. The connecting mount is connected securely to the three-liners-axes mechanism. The first axial rotator is mounted in the connecting mount and has a rotating head. The base is connected securely to the rotating head of the first axial rotator and has a space. The supporting arm is rotatably mounted in the space of the base and has a connecting frame. The second axial rotator is securely connected to the base and the supporting arm and has a rotating head. The third axial rotator is connected to the supporting arm and has a rotating head. The electrode holder is connected to the third axial rotator and the electrode tool.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
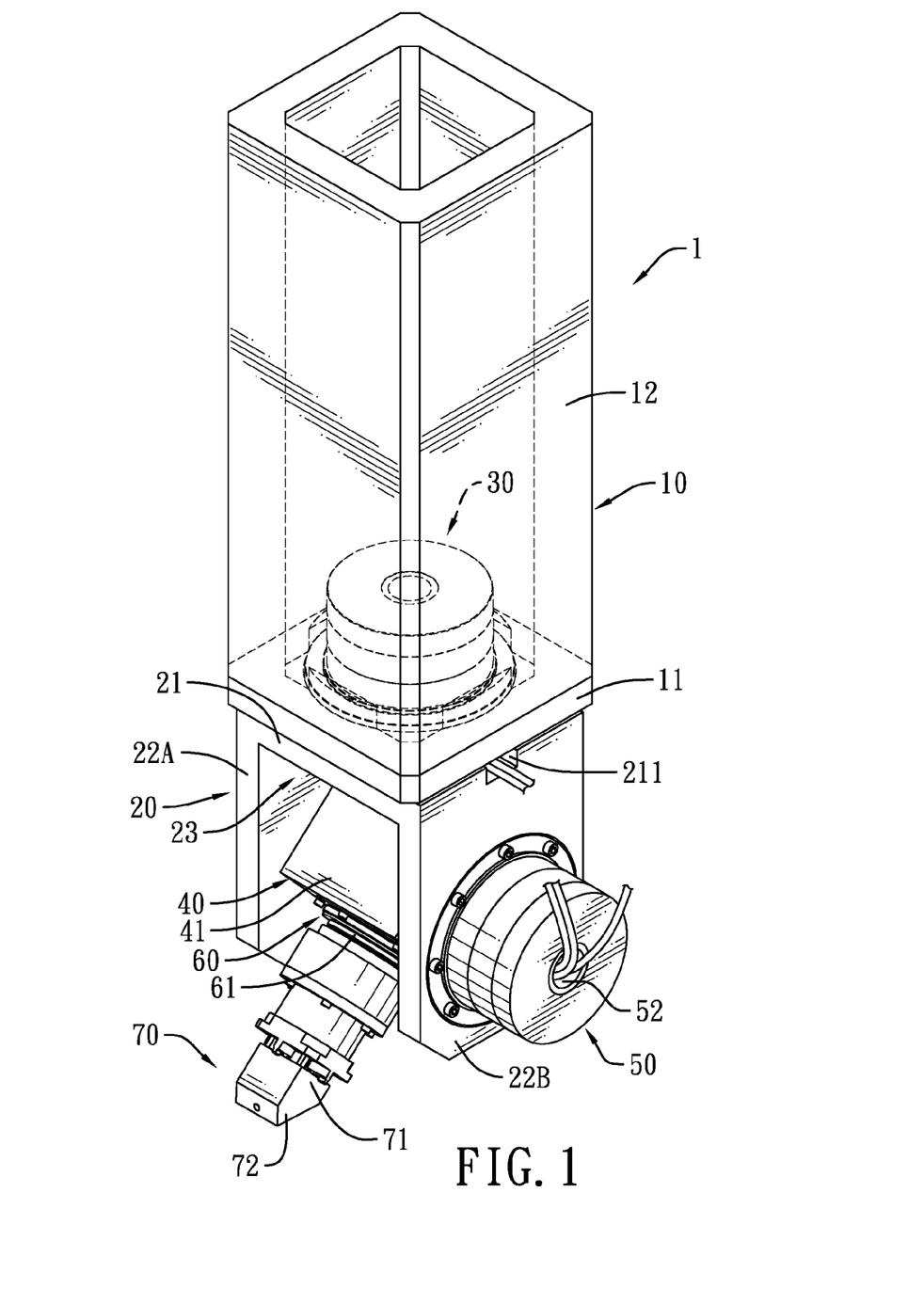
FIG. 1 is a perspective view of a triaxial driving device for an electrodischarge machine tool in accordance with the present invention.
Figure 5:
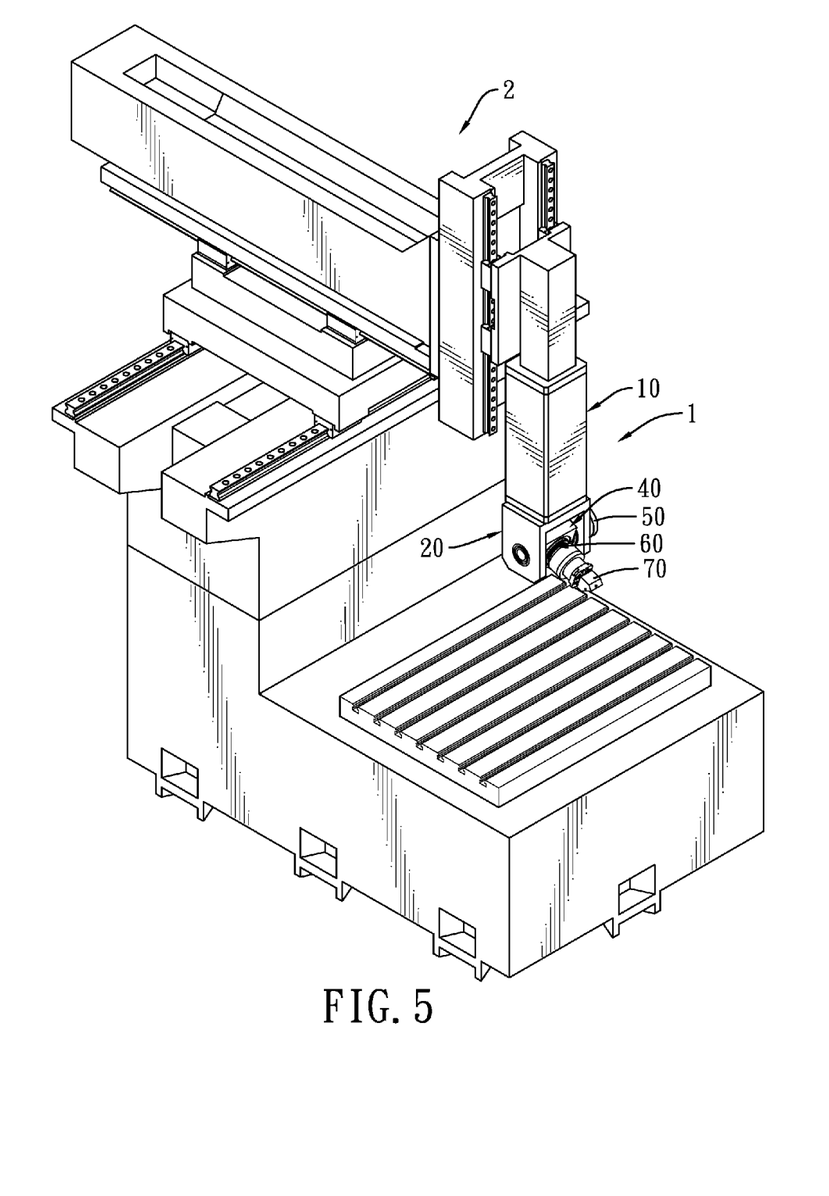
FIG. 5 is an operational perspective view of the triaxial driving device in FIG. 1 mounted on an electrodischarge machine tool.
Figure 6:
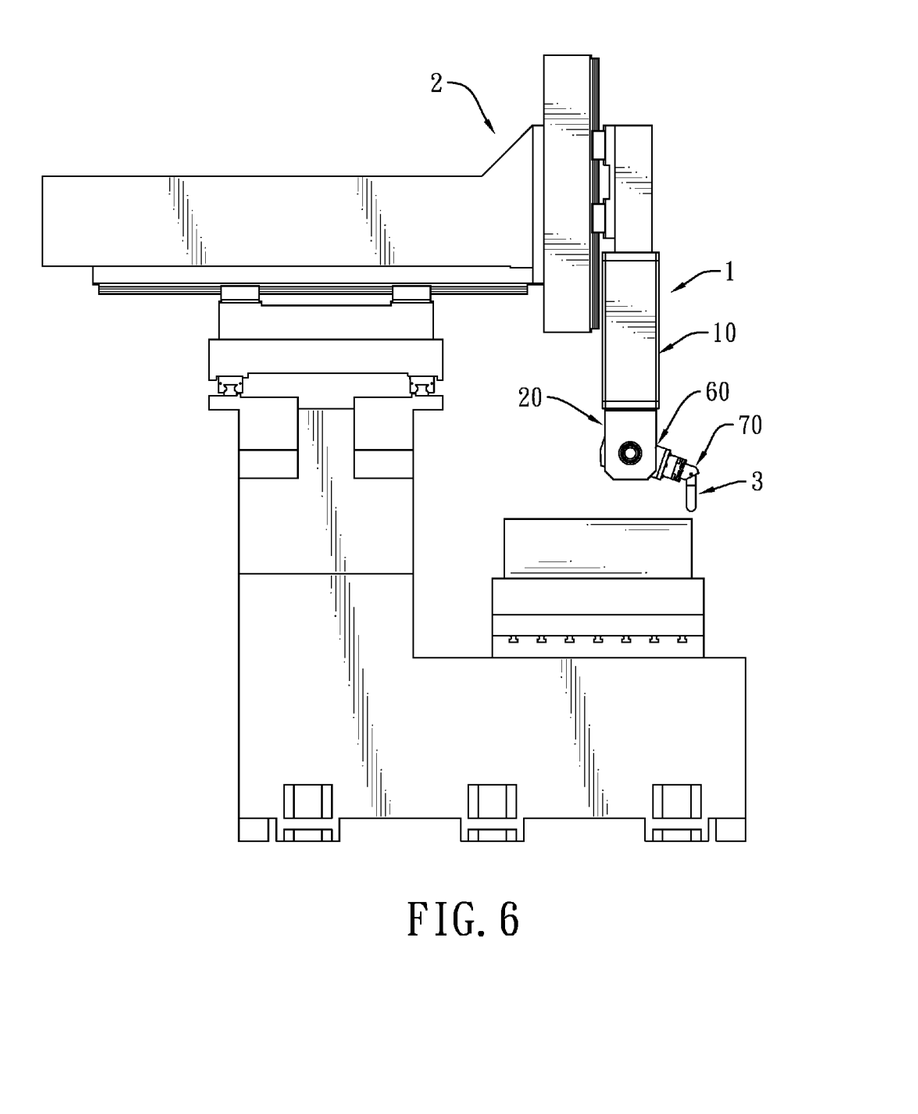
FIG. 6 is an operational side view of the electrodischarge machine tool with the triaxial driving device in FIG. 5.

With reference to FIGS. 1, 5 and 6, a triaxial driving device 1 in accordance with the present invention for an electrodischarge machine tool having a three-liners-axes mechanism 2 with three axes (X-, Y- and Z-axes) and an electrode tool 3 comprises a connecting mount 10, a first axial rotator 30, a base 20, a supporting arm 40, a second axial rotator 50, a third axial rotator 60 and an electrode holder 70.

Figure 2:
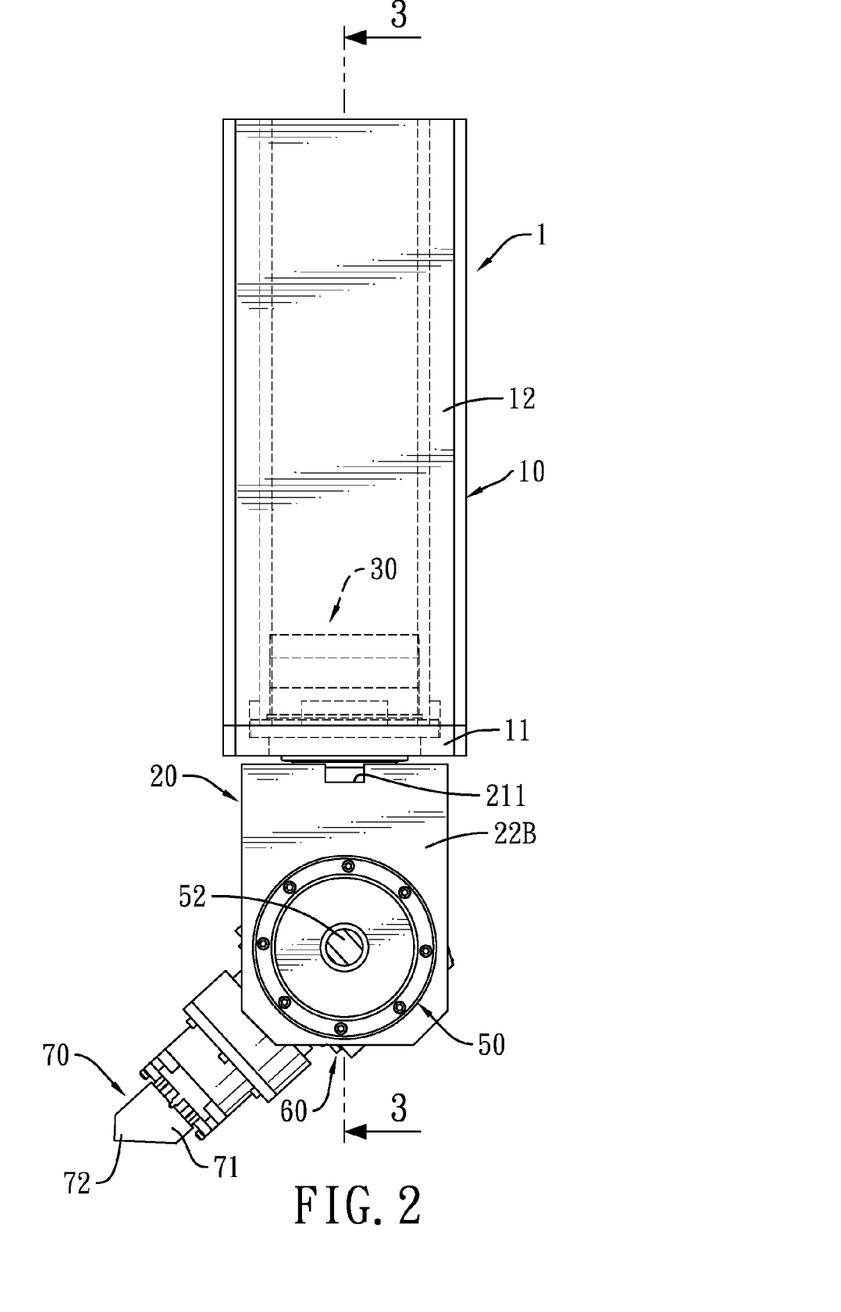
FIG. 2 is a side view of the triaxial driving device in FIG. 1.
Figure 3:
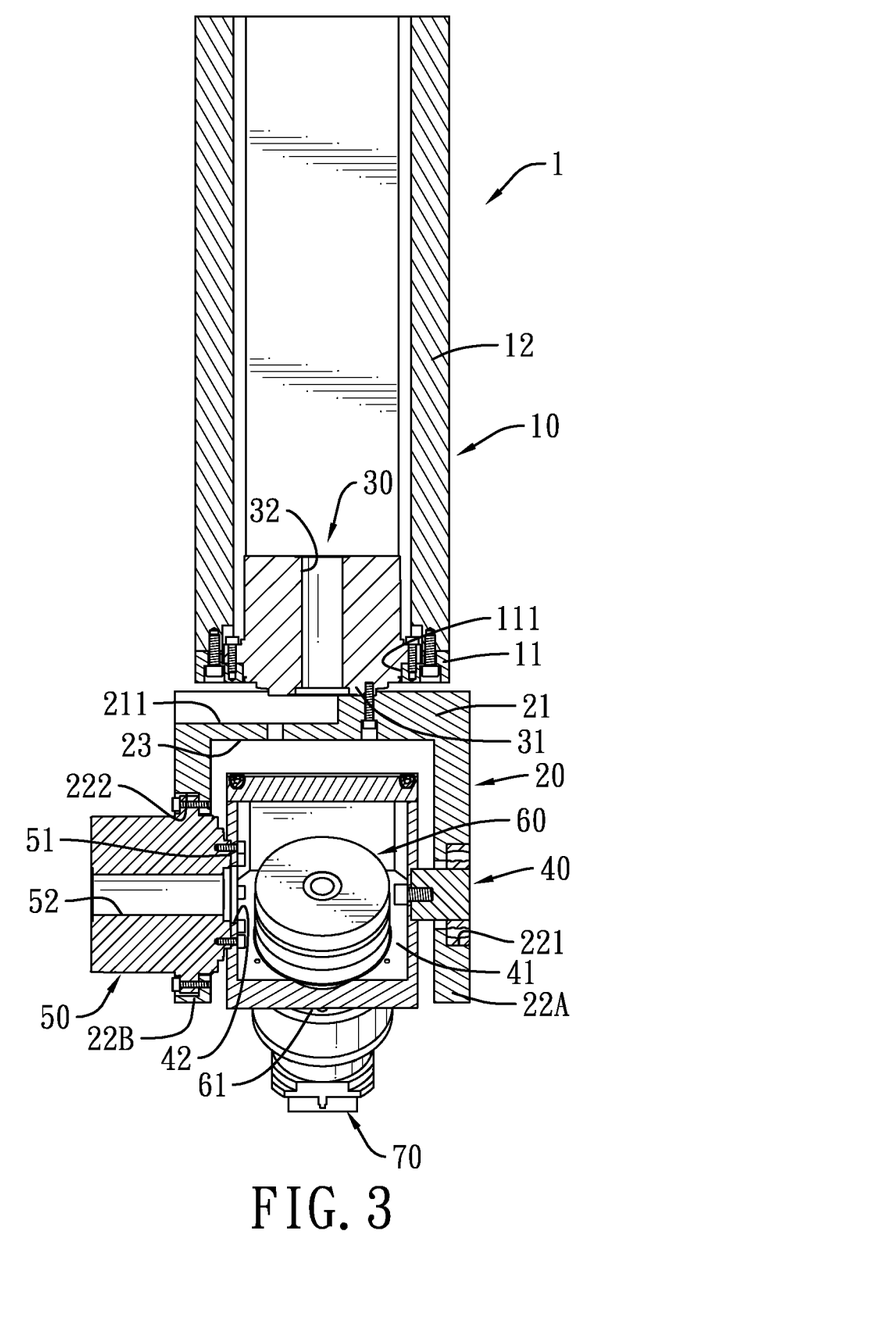
FIG. 3 is a side view in partial section of triaxial driving device in FIG. 2 along line 3-3.

The connecting mount 10 is connected securely to the three-liners-axes mechanism 2 of the electrodischarge machine tool and has a seat tube 12 and a bottom board 11. The seat tube 12 is hollow and is connected securely to the three-liners-axes mechanism 2 along the Z-axis of the three-liners-axes mechanism 2 and has a chamber and a bottom end. With further reference to FIGS. 2 and 3, the bottom board 11 is mounted securely on the bottom end of the seat tube 12 and has a central hole 111 formed through the bottom board 11 and communicates with the chamber of the seat tube 12.

The first axial rotator 30 is mounted in the connecting mount 10, is connected securely to the bottom board 11 and has a top, a bottom, a rotating head 31 and a through hole 32. The top of the first axial rotator 30 is mounted in the chamber of the seat tube 12. The bottom of the first axial rotator 30 extends out of the connecting mount 10 via the central hole 111 of the bottom board 11. The rotating head 31 is mounted on the bottom of the first axial rotator 30. The through hole 32 is formed through the top and the bottom and communicates with the chamber of the seat tube 12.

Figure 4:
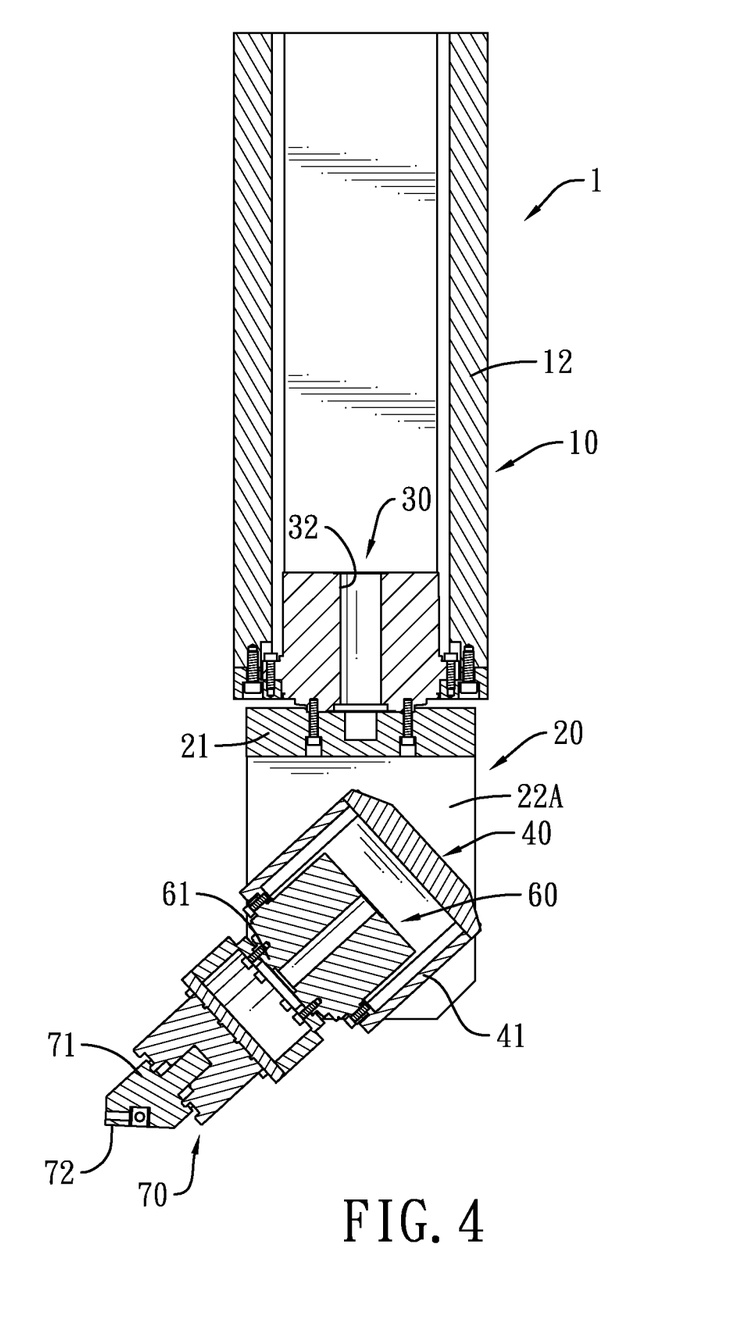
FIG. 4 is another side view in partial section of triaxial driving device in FIG. 2.

With reference to FIGS. 3 and 4, the base 20 is connected securely to the first axial rotator 30 and has a top board 21, two sidewalls 22A, 22B and a space 23. The top board 21 is securely connected to the rotating head 31 of the first axial rotator 30 to enable the base 20 to rotate relative to the connecting mount 10 around the three-liners-axes mechanism 2 along the Z-axis of the three-liners-axes mechanism 2 and has a top, a bottom, a center, a side edge and a wire groove 211. The top of the top board 21 is securely connected to the rotating head 31. The wire groove 211 is formed in the top of the top board 21 between the center and the side edge of the top board 21 and communicates with the through hole 32 of the first axial rotator 30.

The sidewalls 22A, 22B are formed on and protrude downwardly from the bottom of the top board 21 and are parallel with each other, and each sidewall 22A, 22B has a through hole 221, 222. The through holes 221, 222 are respectively formed through the sidewalls 22A, 22B and align with each other. The space 23 is formed in the base 20 between the top board 21 and the sidewalls 22A, 22B and communicates with the wire groove 211.

The supporting arm 40 is rotatably mounted in the space 23 of the base 20 and has an outer end, an inner end and a connecting frame 41. The outer end of the supporting arm 40 is rotatably mounted in the through hole 221 of one of the sidewalls 22A, 22B of the base 20. The inner end of the supporting arm 40 extends in the space 23 of the base 20. The connecting frame 41 is connected to the inner end of the supporting arm 40 and has two opposite sides, a front side and a through hole 42. The opposite sides of the connecting frame 41 respectively face the sidewalls 22A, 22B of the base 20. One of the opposite sides of the connecting frame 41 is securely connected to the inner end of the supporting arm 40. The front side of the connecting frame 41 is formed with and between the opposite sides of the connecting frame 41. The through hole 42 is formed through the opposite side of the connecting frame 41 that is opposite to the supporting arm 40 and aligns with the through hole 222 of the corresponding sidewall 22B of the base 20.

The second axial rotator 50 is securely connected to the base 20 and the supporting arm 40 and has an inner side, an outer side, a rotating head 51 and a through hole 52. The inner side of the second axial rotator 50 is securely mounted in the through hole 222 of the sidewall 22B that faces the through hole 42 of the connecting frame 41. The outer side of the second axial rotator 50 extends out of the base 20 via the corresponding through hole 222. The rotating head 51 is mounted on the inner side of the second axial rotator 50 and is securely connected to the opposite side of the connecting frame 41 that is opposite to the supporting arm 40 to enable the connecting frame 41 to rotate relative to the base 20 around the three-liners-axes mechanism 2 along the X-axis of the three-liners-axes mechanism 2. The through hole 52 is formed though the sides of the second axial rotator 50 and communicates with the through hole 42 of the connecting frame 41.

The third axial rotator 60 is securely connected to the supporting arm 40 and has an inner side, an outer side and a rotating head 61. The inner side of the third axial rotator 60 is securely mounted in the front side of the connecting frame 41 of the supporting frame 40. The outer side of the third axial rotator 60 extends out of the connecting frame 41 via the front side of the connecting frame 41. The rotating head 621 is mounted on the outer side of the third axial rotator 60.

Figure 7:
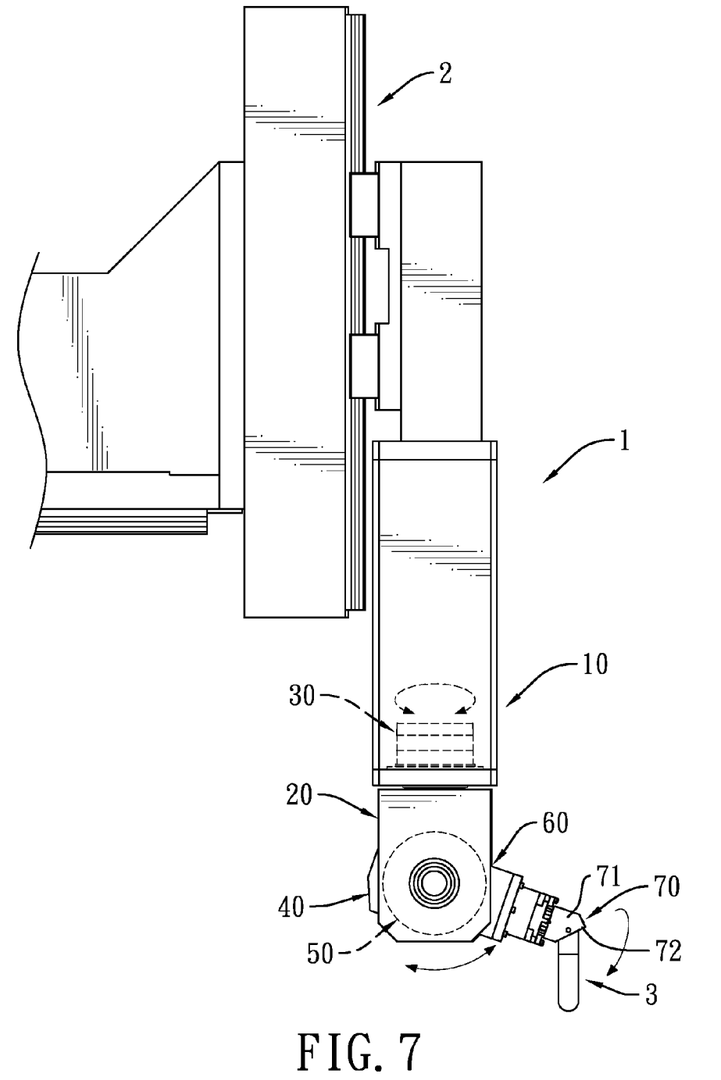
FIG. 7 is an enlarged operational side view of the triaxial driving device in FIG. 6.

With reference to FIGS. 4, 6 and 7, the electrode holder 70 is securely connected to the third axial rotator 60, is connected to the electrode tool 3 of the electrodischarge machine tool and has a mounting end, a connecting end and a clamping block 71. The mounting end of the electrode holder 70 is securely mounted on the rotating head 61 of the third axial rotator 60 to enable the electrode holder 70 to rotate relative to the connecting frame 41 of the supporting arm 40 around the three-liners-axes mechanism 2 along the Y-axis of the three-liners-axes mechanism 2. The connecting end of the electrode holder 70 is formed with the mounting end of the electrode holder 70 opposite to the rotating head 61 of the third axial rotator 60. The clamping block 71 is mounted on the connecting end of the electrode holder 70 and has a lower end and a nose 72. The nose 72 is formed on the lower end of the clamping block 71 and has an angle of 45 degrees relative to an axis of the electrode holder 70.

With reference to FIGS. 5 to 7, when the triaxial driving device 1 in accordance with the present invention is mounted on the electrodischarge machine tool between the three-liners-axes mechanism 2 and the electrode tool 3, the axial rotators 30, 50, 60 can be controlled by the electrodischarge machine tool. The axial rotators 30, 50, 60 can provide three-dimensional rotations to the electrode tool 3 that is mounted on the electrode holder 70. In addition, the three-liners-axes mechanism 2 also can provide three-directional movements to the triaxial driving device 1. Then, the electrode tool 3 that is mounted on the electrode holder 70 can obtain six degrees of freedom to manufacture work-pieces with complicated structures and to provide a preferred working accuracy.

Furthermore, with reference to FIGS. 1, 3 and 4, the through hole 32 of the first axial rotator 30 communicates with the chamber of the seat tube 12 and the wire groove 211 and the space 23 of the base 20, and the through hole 52 of the second axial rotator 50 communicates with the through hole 42 of the connecting frame 41 of the supporting arm 40. Then, the control conducting wires of the electrodischarge machine tool can be electrically connected to the axial rotators 30, 50, 60 and the electrode holder 70 via the chamber of the seat tube 12, the wire groove 211 of the top board 21 and the through holes 32, 52, 42 of the axial rotators 30, 50 and the connecting frame 41 of the supporting arm 40. Therefore, when the triaxial driving device 1 is mounted on the electrodischarge machine tool between the three-liners-axes mechanism 2 and the electrode tool 3, the control conducting wires of the electrodischarge machine tool will not be entangled with the external devices of the electrodischarge machine tool.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A triaxial driving device for an electrodischarge machine tool having a three-liners-axes mechanism with three axes (X-, Y- and Z-axes) and an electrode tool, and the triaxial driving device comprising a connecting mount being adapted to connect securely to the three-liners-axes mechanism of the electrodischarge machine tool;

a first axial rotator mounted in the connecting mount and having
  a top mounted in the connecting mount;
  a bottom extending out of the connecting mount; and
  a rotating head mounted on the bottom of the first axial rotator;

a base connected securely to the first axial rotator to enable base to rotate relative to the connecting mount around the three-liners-axes mechanism along the Z-axis of the three-liners-axes mechanism and having a space;

a supporting arm rotatably mounted in the space of the base and having
  an outer end rotatably mounted in the base;
  an inner end extending in the space of the base; and
  a connecting frame connected to the inner end of the supporting arm and having a front side;

a second axial rotator securely connected to the base and the supporting arm and having an inner side securely mounted in the base;
an outer side extending out of the base; and
a rotating head mounted on the inner side of the second axial rotator and securely connected to connecting frame to enable the connecting frame to rotate relative to the base around the three-liners-axes mechanism along the X-axis of the three-liners-axes mechanism;
a third axial rotator securely connected to the supporting arm and having
an inner side securely mounted in the front side of the connecting frame of the supporting frame;
an outer side extending out of the connecting frame via the front side of the connecting frame; and
a rotating head mounted on the outer side of the third axial rotator; and
an electrode holder securely connected to the third axial rotator, being adapted to connect to the electrode tool of the electrodischarge machine tool and having a mounting end securely mounted on the rotating head of the third axial rotator to enable the electrode holder to rotate relative to the connecting frame of the supporting arm around the three-liners-axes mechanism along the Y-axis of three-liners-axes mechanism.

2. The triaxial driving device as claimed in claim 1, wherein
the connecting mount has
a seat tube being hollow and being adapted to connect securely to the three-liners-axes mechanism along the Z-axis of the three-liners-axes mechanism and having
a chamber; and
a bottom end; and
a bottom board mounted securely on the bottom end of the seat tube and having a central hole formed through the bottom board and communicating with the chamber of the seat tube;
the top of the first axial rotator is mounted in the chamber of the seat tube;
the bottom of the first axial rotator extends out of the connecting mount via the central hole of the bottom board; and
the base has
a top board securely connected to the rotating head of the first axial rotator and having
a top securely connected to the rotating head; and
a bottom; and
two sidewalls formed on and protruding downwardly from the bottom of the top board, being parallel with each other and each sidewall having a through hole formed through the sidewall and aligning with the through of the other sidewall.

3. The triaxial driving device as claimed in claim 2, wherein
the top board has
a center;
a side edge; and
a wire groove formed in the top of the top board between the center and the side edge of the top board and communicating with the through hole of the first axial rotator;
the first axial rotator has a through hole formed through the top and the bottom and communicating with the chamber of the seat tube;
the connecting frame has
two opposite sides respectively facing the sidewalls of the base and one of the opposite sides of the connecting frame securely connected to the inner end of the supporting arm; and
a through hole formed through the opposite side of the connecting frame that being opposite to the supporting arm and aligning with the through hole of a corresponding sidewall of the base;
the front side of the connecting frame is formed with and between the opposite sides of the connecting frame;
the inner side of the second axial rotator is securely mounted in the through hole of the sidewall that faces the through hole of the connecting frame;
the outer side of the second axial rotator extends out of the base via the corresponding through hole;
the rotating head is securely connected to the opposite side of the connecting frame that is opposite to the supporting arm; and
the second axial rotator has a through hole formed though the sides of the second axial rotator and communicating with the through hole of the connecting frame.

4. The triaxial driving device as claimed in claim 3, wherein the electrode holder has
a connecting end formed with the mounting end of the electrode holder opposite to the rotating head of the third axial rotator; and
a clamping block mounted on the connecting end of the electrode holder and having
a lower end; and
a nose formed on the lower end of the clamping block and having an angle of degrees relative to an axis of the electrode holder.

5. The triaxial driving device as claimed in claim 1, wherein the electrode holder has
a connecting end formed with the mounting end of the electrode holder opposite to the rotating head of the third axial rotator; and
a clamping block mounted on the connecting end of the electrode holder and having
a lower end; and
a nose formed on the lower end of the clamping block and having an angle of 45 degrees relative to an axis of the electrode holder.

6. The triaxial driving device as claimed in claim 2, wherein the electrode holder has
a connecting end formed with the mounting end of the electrode holder opposite to the rotating head of the third axial rotator; and
a clamping block mounted on the connecting end of the electrode holder and having
a lower end; and
a nose formed on the lower end of the clamping block and having an angle of 45 degrees relative to an axis of the electrode holder.

* * * * *